(12) United States Patent
Liu et al.

(10) Patent No.: US 11,959,826 B2
(45) Date of Patent: Apr. 16, 2024

(54) ENGINE SIMULATION TEST DEVICE CAPABLE OF REALIZING ULTRAHIGH COMPRESSION TEMPERATURE AND PRESSURE

(71) Applicant: Harbin Engineering University, Harbin (CN)

(72) Inventors: Long Liu, Harbin (CN); Yue Wu, Harbin (CN); Dai Liu, Harbin (CN); Qian Xiong, Harbin (CN); Xinru Shi, Harbin (CN); Shihai Liu, Harbin (CN); Chen An, Harbin (CN); Qihao Mei, Harbin (CN)

(73) Assignee: HARBIN ENGINEERING UNIVERSITY, Harbin (CN)

( * ) Notice: Subject to any disclaimer, the term of this patent is extended or adjusted under 35 U.S.C. 154(b) by 359 days.

(21) Appl. No.: 17/564,558

(22) Filed: Dec. 29, 2021

(65) Prior Publication Data

US 2022/0120636 A1 Apr. 21, 2022

(30) Foreign Application Priority Data

Jul. 15, 2021 (CN) .......................... 202110803703.8

(51) Int. Cl.
*G01M 15/08* (2006.01)
*G01M 15/05* (2006.01)

(52) U.S. Cl.
CPC ............ *G01M 15/05* (2013.01); *G01M 15/08* (2013.01)

(58) Field of Classification Search
CPC .................................................. G01M 15/08
See application file for complete search history.

(56) References Cited

U.S. PATENT DOCUMENTS

| 11,495,375 | B2* | 11/2022 | Pizzi | ................ | H01C 17/06586 |
| 2022/0010712 | A1* | 1/2022 | Szolak | .................. | F01N 3/0253 |
| 2022/0120250 | A1* | 4/2022 | Liu | .................... | F02M 21/0221 |

FOREIGN PATENT DOCUMENTS

| CN | 103808516 A | 5/2014 |
| CN | 112503570 A | 3/2021 |

* cited by examiner

*Primary Examiner* — Eric S. McCall
(74) *Attorney, Agent, or Firm* — IPRO, PLLC

(57) ABSTRACT

The disclosure is an engine simulation test device capable of realizing an ultrahigh compression temperature and pressure, belonging to the field of a diesel engine high-temperature and high-pressure system, solving the problems that the existing engine simulation test cannot achieve ultra-high compression temperature and pressure, and the temperature and pressure are not adjustable. It includes a compressed air inlet mechanism, a nitrogen gas inlet mechanism, a pressure stabilizing mechanism, a cyclic heating mechanism, an air inlet mechanism and a fast compressor mechanism. The compressed air inlet mechanism and the nitrogen gas inlet mechanism are both connected with a gas inlet end of a pressure stabilizing tank in the pressure stabilizing mechanism, the compressed air inlet mechanism and the nitrogen gas inlet mechanism respectively introduce air and nitrogen gas into the pressure stabilizing tank, the pressure stabilizing tank is connected with the cyclic heating mechanism, the cyclic heating mechanism heats gas in the pressure stabilizing tank, a gas outlet end of the pressure stabilizing tank is connected with the fast compressor mechanism, and the air inlet mechanism is connected between the pressure stabilizing tank and the fast compressor mechanism. The device is mainly used for an engine simulation test.

10 Claims, 1 Drawing Sheet

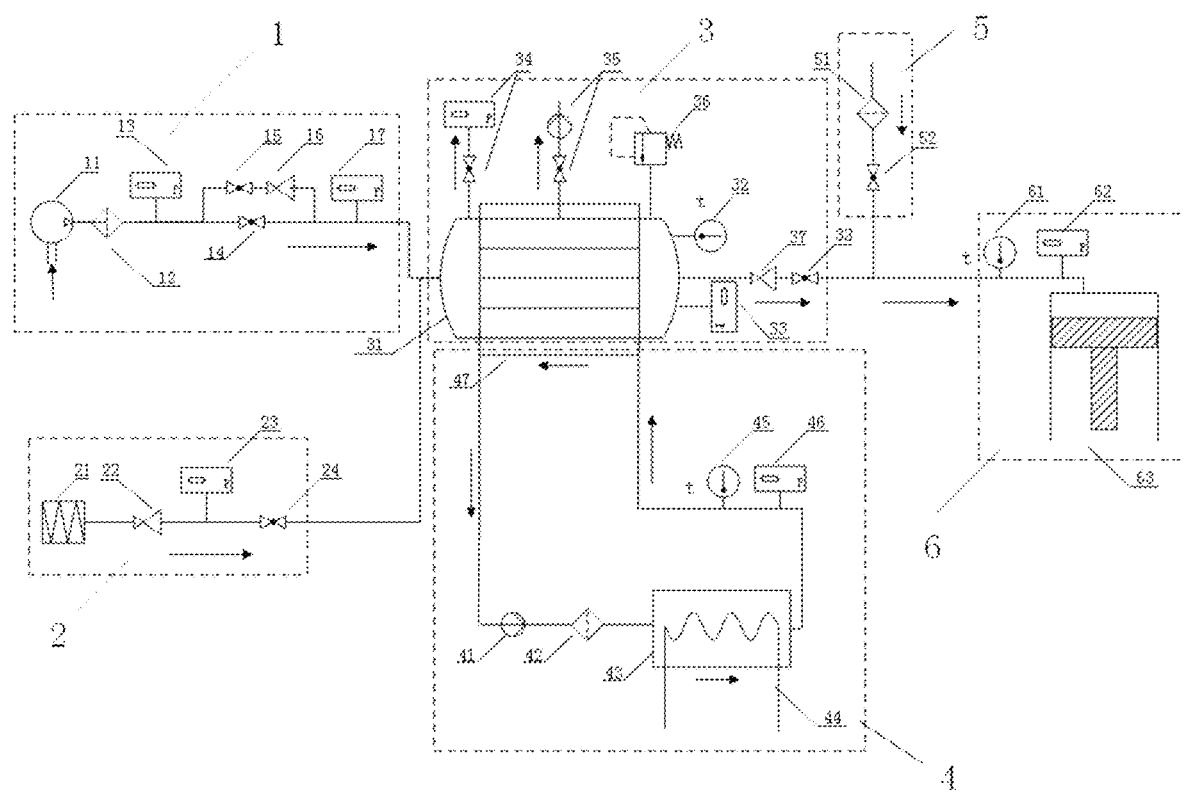

ENGINE SIMULATION TEST DEVICE CAPABLE OF REALIZING ULTRAHIGH COMPRESSION TEMPERATURE AND PRESSURE

TECHNICAL FIELD

The disclosure belongs to the field of a diesel engine high-temperature and high-pressure system, and especially relates to an engine simulation test device capable of realizing ultrahigh compression temperature and pressure.

BACKGROUND

Generally, a two-stroke low-speed engine has a higher temperature and pressure at the end of compression, the temperature can reach 893K, and the pressure can reach 150 bar. It is generally difficult for a constant volume bomb test system to achieve such a high temperature and pressure. In order to simulate the test condition at the end of the engine compression, it is usually necessary to use a compression type test instrument to meet the requirement. However, the two-stroke low-speed engine often have a larger stroke, which leads to relatively large and cumbersome equipment and materials to truly simulate long-stroke engine. Therefore, it is common to use a short-stroke fast compressor instead of a long-stroke testing machine to achieve the same test effect. However, the temperature and pressure of the short-stroke fast compressor at the end of the compression cannot meet the requirements. This needs to provide a higher initial intake pressure and temperature, so that after the compression of the fast compressor, the pressure and temperature at the end of the compression can meet the test conditions requirement. At the same time, the required temperature and pressure conditions under different engine operating conditions are different, so that the test equipment also needs to be capable of flexibly providing various different terminal temperatures and pressures. Sometimes, different gas compositions are also needed, for example, a pure nitrogen environment or a nitrogen and oxygen environment with different concentration ratios.

At present, most of the common gas supply equipment can only provide lower temperature and pressure, or only provide higher pressure but cannot meet higher temperature at the same time. After the compression of the fast compressor, the temperature and pressure of the environment cannot meet the test requirements. Meanwhile, the temperature, pressure and gas composition cannot be adjusted flexibly. Therefore, in order to simulate the working process of an actual engine, a test apparatus capable of realizing an ultrahigh temperature and pressure is urgently needed, the temperature and the pressure are adjustable, and gas environments with different concentration ratios can be provided at the same time.

SUMMARY

In order to solve the problems in the prior art, the disclosure provides an engine simulation test device capable of realizing an ultrahigh compression temperature and pressure.

In order to achieve the above objective, the disclosure adopts the following technical solution: an engine simulation test device capable of realizing an ultrahigh compression temperature and pressure includes a compressed air inlet mechanism, a nitrogen gas inlet mechanism, a pressure stabilizing mechanism, a cyclic heating mechanism, an air inlet mechanism and a fast compressor mechanism. The compressed air inlet mechanism and the nitrogen gas inlet mechanism are both connected with a gas inlet end of a pressure stabilizing tank in the pressure stabilizing mechanism, the compressed air inlet mechanism and the nitrogen gas inlet mechanism respectively introduce air and nitrogen gas into the pressure stabilizing tank, the pressure stabilizing tank is connected with the cyclic heating mechanism, the cyclic heating mechanism heats gas in the pressure stabilizing tank, a gas outlet end of the pressure stabilizing tank is connected with the fast compressor mechanism, and the air inlet mechanism is connected between the pressure stabilizing tank and the fast compressor mechanism.

Further, the compressed air inlet mechanism includes an air compressor, a first air filter, a first pressure sensor, a first electric ball valve, a second electric ball valve, a first pressure reducing valve and a second pressure sensor. The air compressor is connected with the first air filter, the first air filter is connected with the pressure stabilizing tank through an air path pipeline, the first pressure sensor, the first electric ball valve and the second pressure sensor are sequentially disposed on the air path pipeline in an air supply direction; and the second electric ball valve is connected in parallel to two sides of the first electric ball valve, and a rear end of the second electric ball valve is connected with the first pressure reducing valve.

Further, the second pressure sensor is in communication connection with the first pressure reducing valve.

Further, the nitrogen gas inlet mechanism includes a nitrogen gas cylinder, a second pressure reducing valve, a third pressure sensor and a third electric ball valve in sequential connection in an air supply direction, and the third pressure sensor and the second pressure reducing valve are in communication connection.

Further, the pressure stabilizing mechanism includes the pressure stabilizing tank, a first temperature sensor, a fourth pressure sensor, a pressure control battery valve, a vacuum pump, a safety valve, a third pressure reducing valve and a fourth electric ball valve; the first temperature sensor and the fourth pressure sensor are respectively connected to the inside of the pressure stabilizing tank, and a temperature and pressure of gas inside the pressure stabilizing tank are monitored; the pressure control battery valve, the vacuum pump and the safety valve are respectively connected with the pressure stabilizing tank; and a gas outlet end of the pressure stabilizing tank is sequentially connected with the third pressure reducing valve and the fourth electric ball valve in an air outlet direction.

Further, the first temperature sensor and the fourth pressure sensor are respectively in communication connection with the cyclic heating mechanism and the pressure control battery valve.

Further, the cyclic heating mechanism is an ethylene glycol cyclic heating mechanism.

Further, the ethylene glycol cyclic heating mechanism includes a temperature control circulation pump, a water filter, an ethylene glycol box, an electric heater, a second temperature sensor, a fifth pressure sensor and a tubular heat exchanger, the tubular heat exchanger is disposed inside the pressure stabilizing tank, two ends of the tubular heat exchanger are respectively connected with a water outlet end and a water return end of the ethylene glycol box, the electric heater is disposed inside the ethylene glycol box, the second temperature sensor and the fifth pressure sensor are disposed between the water outlet end of the ethylene glycol box and the tubular heat exchanger, and the temperature control circulation pump and the water filter are disposed on the water return end of the ethylene glycol box.

Further, the second temperature sensor and the fifth pressure sensor are in communication connection with the electric heater.

Further, the air inlet mechanism includes a second air filter and a fifth electric ball valve in sequential connection in an air supply direction, the fast compressor mechanism includes a third temperature sensor, a sixth pressure sensor and a fast compressor in sequential connection in an air flow direction, and the third temperature sensor and the sixth pressure sensor are respectively in communication connection with the pressure stabilizing mechanism and the cyclic heating mechanism.

Compared with the prior art, the disclosure has the beneficial effects that the disclosure solves the problems of ultrahigh compression temperature and pressure realizing incapability and nonadjustable temperature and pressure of an existing engine stimulation test. The disclosure can create test conditions of the ultrahigh compression temperature and pressure to simulate a working process of a two-stroke engine. Additionally, the temperature and pressure of the gas and the gas composition can be flexibly changed, the simultaneous providing of higher pressure and temperature air inlet can be achieved, the air inlet pressure can reach 8.5 bar to a highest degree, and the air inlet temperature can reach 500 K to a highest degree. In cooperation with the temperature rise and pressure increase in the compression process, the test conditions of temperature reaching 893 K and pressure reaching 150 bar can be finally achieved. Finally, the gas temperature and pressure can be flexibly controlled. Additionally, the ratio of different oxygen gas and nitrogen gas concentration can be achieved, and the implementation of various combustion strategies can be favorably promoted.

BRIEF DESCRIPTION OF FIGURES

FIG. 1 is a schematic structure diagram of an engine simulation test device capable of realizing an ultrahigh compression temperature and pressure.

In the FIGURE, 1 denotes a compressed air inlet mechanism, 2 denotes a nitrogen gas inlet mechanism, 3 denotes a pressure stabilizing mechanism, 4 denotes a cyclic heating mechanism, 5 denotes an air inlet mechanism, 6 denotes a fast compressor mechanism, 11 denotes an air compressor, 12 denotes a first air filter, 13 denotes a first pressure sensor, 14 denotes a first electric ball valve, 15 denotes a second electric ball valve, 16 denotes a first pressure reducing valve, 17 denotes a second pressure sensor, 21 denotes a nitrogen gas cylinder, 22 denotes a second pressure reducing valve, 23 denotes a third pressure sensor, 24 denotes a third electric ball valve, 31 denotes a pressure stabilizing tank, 32 denotes a first temperature sensor, 33 denotes a fourth pressure sensor, 34 denotes a pressure control battery valve, 35 denotes a vacuum pump, 36 denotes a safety valve, 37 denotes a third pressure reducing valve, 38 denotes a fourth electric ball valve, 41 denotes a temperature control circulation pump, 42 denotes a water filter, 43 denotes an ethylene glycol box, 44 denotes an electric heater, 45 denotes a second temperature sensor, 46 denotes a fifth pressure sensor, 47 denotes a tubular heat exchanger, 51 denotes a second air filter, 52 denotes a fifth electric ball valve, 61 denotes a third temperature sensor, 62 denotes a sixth pressure sensor, and 63 denotes a fast compressor.

DETAILED DESCRIPTION

The technical solution in examples of the disclosure will be clearly and completely illustrated hereafter in combination with drawings in the example of the disclosure.

Referring to FIG. 1 for the implementation of the disclosure, an engine simulation test device capable of realizing an ultrahigh compression temperature and pressure includes a compressed air inlet mechanism 1, a nitrogen gas inlet mechanism 2, a pressure stabilizing mechanism 3, a cyclic heating mechanism 4, an air inlet mechanism 5 and a fast compressor mechanism 6. The compressed air inlet mechanism 1 and the nitrogen gas inlet mechanism 2 are respectively connected with a gas inlet end of a pressure stabilizing tank 31 in the pressure stabilizing mechanism 3, the compressed air inlet mechanism 1 and the nitrogen gas inlet mechanism 2 respectively introduce air and nitrogen gas into the pressure stabilizing tank 31, the pressure stabilizing tank 31 is connected with the cyclic heating mechanism 4, the cyclic heating mechanism 4 heats gas in the pressure stabilizing tank 31, a gas outlet end of the pressure stabilizing tank 31 is connected with the fast compressor mechanism 6, and the air inlet mechanism 5 is connected between the pressure stabilizing tank 31 and the fast compressor mechanism 6.

The example needs to provide air inlet conditions of the higher temperature and pressure, so that the ultrahigh temperature and pressure are achieved at a compression terminal through a compression effect of a fast compressor. The compressed air inlet mechanism 1 and the nitrogen gas air inlet mechanism 2 select to provide higher-pressure air or nitrogen gas, the pressure stabilizing mechanism 3 stores the introduced gas, the cyclic heating mechanism 4 heats the gas in the pressure stabilizing tank 31, and the fast compressor mechanism 6 further raises the gas temperature and pressure, so that the gas state of the ultrahigh temperature and pressure is obtained. The compressed air inlet mechanism 1 and the nitrogen gas inlet mechanism 2 can control the pressure of gas introduced into the pressure stabilizing tank 31, and the cyclic heating mechanism 4 can adjust a heating temperature of the pressure stabilizing tank 31. Meanwhile, a pressure control exhaust valve on the pressure stabilizing tank 31 can further adjust the temperature and pressure of the gas with the raised pressure in the pressure stabilizing tank 31 after the heating by the cyclic heating mechanism 4. Therefore, the final air inlet temperature and pressure is flexibly adjusted to obtain different compression terminal temperatures and pressures. The pressure stabilizing tank 31 is vacuumized through a vacuum pump 35 on the pressure stabilizing tank 31. The introduction partial pressure of the compressed air inlet mechanism 1 and the nitrogen gas inlet mechanism 2 are adjusted to adjust the concentration of the introduced oxygen gas and nitrogen gas, so that air and nitrogen gas mixed gas with different concentrations is flexibly controlled to be formed. Meanwhile, according to the device, only normal-temperature normal-pressure air can be selected to be introduced.

The example can select the compressed air inlet mechanism 1, the nitrogen gas inlet mechanism 2 or the air inlet mechanism 5 to provide various gas supply modes for the fast compressor mechanism 6. Additionally, the air inlet pressure and temperature can be flexibly adjusted, including the air and nitrogen gas inlet at the pressure of 1 to 10 bar and the temperature of 273 to 500 K. Additionally, the air and nitrogen gas inlet mixed gas mixed at different proportions can be provided by adjusting the air inlet flow rate of the compressed air inlet mechanism 1 and the nitrogen gas inlet mechanism 2. The pressure stabilizing mechanism 3 and the cyclic heating mechanism 4 heat gas in the pressure stabilizing tank 31, and adjust the temperature of the gas in the pressure stabilizing mechanism 3. The gas is further compressed through the fast compressor mechanism 6, and a gas system of an ultrahigh temperature and pressure can be obtained.

The compressed air inlet mechanism 1 and the nitrogen gas inlet mechanism 2 can select to provide high-pressure air or high-pressure nitrogen gas, the pressure stabilizing tank 31 is configured to store the high-pressure air or high-pressure nitrogen gas and adjust the temperature and pressure of gas in the tank. The cyclic heating mechanism 4 heats the gas in the pressure stabilizing tank 31 and adjusts the temperature of gas in the pressure stabilizing tank 31. The air inlet mechanism 5 provides another normal-temperature normal-pressure air inlet mode, and the fast compressor mechanism 6 is configured to further raise the gas temperature and pressure.

The compressed air inlet mechanism 1 is configured to provide pressure-adjustable high-pressure air, and the pressure ranges from 1 to 10 bar. The compressed air inlet mechanism 1 includes an air compressor 11, a first air filter 12, a first pressure sensor 13, a first electric ball valve 14, a second electric ball valve 15, a first pressure reducing valve 16 and a second pressure sensor 17. The air compressor 11 is connected with the first air filter 12, the air compressor 11 is configured to compress fresh air to obtain high-pressure air, and a maximum compression pressure is 10 bar. The first air filter 12 is configured to filter impurities in the air, and is connected with the pressure stabilizing tank 31 through an air path pipeline, the first pressure sensor 13, the first electric ball valve 14 and the second pressure sensor 17 are sequentially disposed on the air path pipeline in an air supply direction. The first pressure sensor 13 is configured to measure the pressure of the compressed air, the second electric ball valve 15 is connected in parallel to two sides of the first electric ball valve 14, and a rear end of the second electric ball valve 15 is connected with the first pressure reducing valve 16. The first pressure reducing valve 16 is configured to adjust a pressure of a branch path in which the first pressure reducing valve 16 is located. The first electric ball valve 14 and the second electric ball valve 15 respectively open and close respective air paths. Then, the two air paths are merged into one air path. The second pressure sensor 17 is in communication connection with the first pressure reducing valve 16. The second pressure sensor 17 is configured to monitor the pressure after adjustment and feed back the pressure to the first pressure reducing valve 16 to adjust the pressure of output gas.

The nitrogen gas inlet mechanism 2 is configured to provide adjustable high-pressure nitrogen gas, and includes a nitrogen gas cylinder 21, a second pressure reducing valve 22, a third pressure sensor 23 and a third electric ball valve 24 in sequential connection in an air supply direction. The third pressure sensor 23 and the second pressure reducing valve 22 are in communication connection. The nitrogen gas cylinder 21 is configured to provide high-pressure nitrogen gas, the second pressure reducing valve 22 is configured to adjust the pressure of the output nitrogen gas, the third pressure sensor 23 is configured to monitor the gas pressure in the air path and feed back the gas pressure in the air path to the second pressure reducing valve 22 to adjust the air path pressure, and the third electric ball valve 24 is configured to open and close the air path.

The pressure stabilizing mechanism 3 is configured to store air or nitrogen gas, and can further adjust the pressure and temperature of gas in the pressure stabilizing tank 31. The pressure stabilizing mechanism 3 includes the pressure stabilizing tank 31, a first temperature sensor 32, a fourth pressure sensor 33, a pressure control battery valve 34, a vacuum pump 35, a safety valve 36, a third pressure reducing valve 37 and a fourth electric ball valve 38. The first temperature sensor 32 and the fourth pressure sensor 33 are respectively connected to the inside of the pressure stabilizing tank 31, and a temperature and pressure of gas inside the pressure stabilizing tank 31 are monitored. The pressure control battery valve 34, the vacuum pump 35 and the safety valve 36 are respectively connected with the pressure stabilizing tank 31. A gas outlet end of the pressure stabilizing tank 31 is sequentially connected with the third pressure reducing valve 37 and the fourth electric ball valve 38 in an air outlet direction. The pressure stabilizing tank 31 is configured to store high-pressure gas. The first temperature sensor 32 and the fourth pressure sensor 33 are configured to monitor the temperature and pressure in the pressure stabilizing tank 31. The first temperature sensor 32 and the fourth pressure sensor 33 are respectively in communication connection with the cyclic heating mechanism 4 and the pressure control battery valve 34, and respectively adjust the temperature and pressure of gas in the pressure stabilizing tank 31. When the temperature and pressure of gas in the pressure stabilizing tank 31 rise due to heating, the pressure control battery valve 34 properly exhausts according to the feedback of the fourth pressure sensor 33, and the pressure of gas in the pressure stabilizing tank 31 is further adjusted. The vacuum pump 35 is configured to vacuumize the pressure stabilizing tank 31 in a vacuum state, and the mixing proportion of the air and the nitrogen gas can be conveniently calculated and adjusted. The safety valve 36 achieves a pressure relief effect when the pressure in the tank is higher than a certain pressure to protect the pressure stabilizing tank 31. The third pressure reducing valve 37 is configured to further adjust the air path pressure, and the fourth electric ball valve 38 is configured to control the opening and closing of the air path.

The cyclic heating mechanism 4 is configured to heat the pressure stabilizing tank 31 and adjust the temperature of gas in the pressure stabilizing tank 31. The cyclic heating mechanism 4 is an ethylene glycol cyclic heating mechanism. The ethylene glycol cyclic heating mechanism includes a temperature control circulation pump 41, a water filter 42, an ethylene glycol box 43, an electric heater 44, a second temperature sensor 45, a fifth pressure sensor 46 and a tubular heat exchanger 47. The tubular heat exchanger 47 is disposed inside the pressure stabilizing tank 31, two ends of the tubular heat exchanger 47 are respectively connected with a water outlet end and a water return end of the ethylene glycol box 43, the electric heater 44 is disposed inside the ethylene glycol box 43, the second temperature sensor 45 and the fifth pressure sensor 46 are disposed between the water outlet end of the ethylene glycol box 43 and the tubular heat exchanger 47, and the temperature control circulation pump 41 and the water filter 42 are disposed on the water return end of the ethylene glycol box 43.

The temperature control circulation pump 41 provides power for the cyclic heating mechanism 4, and controls a heat exchange speed by controlling a flow rate of ethylene glycol. The water filter 42 filters impurities in ethylene glycol circulation. The electric heater 44 is configured to heat ethylene glycol in the ethylene glycol box 43, And control the ethylene glycol circulation temperature by adjusting the current of the electric heater through the feedback of the second temperature sensor 45 and the fifth pressure sensor 46. The temperature control circulation pump 41 provides power for the ethylene glycol circulation system 4 and controls the heat exchange speed by controlling the flow rate of the ethylene glycol. The water filter 42 filters impurities in the ethylene glycol circulation. The electric heater 44 is configured to heat ethylene glycol in the ethylene glycol box 43. The second temperature sensor 45 and the fifth pressure sensor 46 are in communication connection with the electric heater 44, and control the ethylene glycol circulation temperature by adjusting the current of the electric heater 44 through the feedback of the temperature sensor 45 and the pressure sensor 46. The tubular heat exchanger 47 and the pressure stabilizing tank 31 exchange heat to heat the pressure stabilizing tank 31.

The air inlet mechanism 5 is configured to provide normal-temperature and normal-pressure air inlet for the fast compressor mechanism 6, so that the air inlet flexibility is improved. The air inlet mechanism 5 includes a second air filter 51 and a fifth electric ball valve 52 in sequential connection in the air supply direction. The second air filter 51 is configured to filter impurities in the air. The fifth electric ball valve 52 is configured to control the closing of the air path.

The fast compressor mechanism 6 is a final test device, compresses the inlet air and further raises the air temperature and pressure. According to the law of thermodynamics, a final gas temperature can reach 893 K, and the pressure can reach 150 bar. The fast compressor mechanism 6 includes a third temperature sensor 61, a sixth pressure sensor 62 and a fast compressor 63 in sequential connection in the air supply direction, and the third temperature sensor 61 and the sixth pressure sensor 62 are respectively in communication connection with the pressure stabilizing mechanism 3 and the cyclic heating mechanism 4. The third temperature sensor 61 and the sixth pressure sensor 62 are configured to monitor the temperature and pressure of inlet air provided for the fast compressor 63 in the final air path, and perform feedback for adjusting the temperature and pressure of gas in the air path. The fast compressor 63 is configured to compress gas and perform a test.

The engine simulation test device capable of realizing an ultrahigh compression temperature and pressure provided by the disclosure has been illustrated in detailed. In the disclosure, a specific example is used to illustrate the principle and implementation of the disclosure. The descriptions of the above example are only to help people understand the method and its core idea. Meanwhile, for ordinary skill in the art, changes may be made on implementations and application ranges according to the concept of the disclosure. Based on the above, this description shall not be understood as limitation to the disclosure.

What is claimed is:

1. An engine simulation test device capable of realizing ultrahigh compression temperature and pressure, comprising a compressed air inlet mechanism (1), a nitrogen gas inlet mechanism (2), a pressure stabilizing mechanism (3), a cyclic heating mechanism (4), an air inlet mechanism (5) and a fast compressor mechanism (6), wherein the compressed air inlet mechanism (1) and the nitrogen gas inlet mechanism (2) are respectively connected with a gas inlet end of a pressure stabilizing tank (31) in the pressure stabilizing mechanism (3), the compressed air inlet mechanism (1) and the nitrogen gas inlet mechanism (2) respectively introduce air and nitrogen gas into the pressure stabilizing tank (31), the pressure stabilizing tank (31) is connected with the cyclic heating mechanism (4), the cyclic heating mechanism (4) heats gas in the pressure stabilizing tank (31), a gas outlet end of the pressure stabilizing tank (31) is connected with the fast compressor mechanism (6), and the air inlet mechanism (5) is connected between the pressure stabilizing tank (31) and the fast compressor mechanism (6).

2. The engine simulation test device capable of realizing ultrahigh compression temperature and pressure according to claim 1, wherein the nitrogen gas inlet mechanism (2) comprises a nitrogen gas cylinder (21), a second pressure reducing valve (22), a third pressure sensor (23) and a third electric ball valve (24) in sequential connection in an air supply direction, and the third pressure sensor (23) and the second pressure reducing valve (22) are in communication connection.

3. The engine simulation test device capable of realizing ultrahigh compression temperature and pressure according to claim 1, wherein the air inlet mechanism (5) comprises a second air filter (51) and a fifth electric ball valve (52) in sequential connection in an air supply direction, the fast compressor mechanism (6) comprises a third temperature sensor (61), a sixth pressure sensor (62) and a fast compressor (63) in sequential connection in an air flow direction, and the third temperature sensor (61) and the sixth pressure sensor (62) are respectively in communication connection with the pressure stabilizing mechanism (3) and the cyclic heating mechanism (4).

4. The engine simulation test device capable of realizing ultrahigh compression temperature and pressure according to claim 1, wherein the compressed air inlet mechanism (1) comprises an air compressor (11), a first air filter (12), a first pressure sensor (13), a first electric ball valve (14), a second electric ball valve (15), a first pressure reducing valve (16) and a second pressure sensor (17), the air compressor (11) is connected with the first air filter (12), the first air filter (12) is connected with the pressure stabilizing tank (31) through an air path pipeline, the first pressure sensor (13), the first electric ball valve (14) and the second pressure sensor (17) are sequentially disposed on the air path pipeline in an air supply direction, the second electric ball valve (15) is connected in parallel to two sides of the first electric ball valve (14), and a rear end of the second electric ball valve (15) is connected with the first pressure reducing valve (16).

5. The engine simulation test device capable of realizing ultrahigh compression temperature and pressure according to claim 4, wherein the second pressure sensor (17) is in communication connection with the first pressure reducing valve (16).

6. The engine simulation test device capable of realizing ultrahigh compression temperature and pressure according to claim 1, wherein the pressure stabilizing mechanism (3) comprises the pressure stabilizing tank (31), a first temperature sensor (32), a fourth pressure sensor (33), a pressure control battery valve (34), a vacuum pump (35), a safety valve (36), a third pressure reducing valve (37) and a fourth electric ball valve (38); the first temperature sensor (32) and the fourth pressure sensor (33) are respectively connected to an inside of the pressure stabilizing tank (31), and temperature and pressure of gas inside the pressure stabilizing tank (31) are monitored; the pressure control battery valve (34), the vacuum pump (35) and the safety valve (36) are respectively connected with the pressure stabilizing tank (31); and a gas outlet end of the pressure stabilizing tank (31) is sequentially connected with the third pressure reducing valve (37) and the fourth electric ball valve (38) in an air outlet direction.

7. The engine simulation test device capable of realizing ultrahigh compression temperature and pressure according to claim 6, wherein the first temperature sensor (32) and the fourth pressure sensor (33) are respectively in communication connection with the cyclic heating mechanism (4) and the pressure control battery valve (34).

8. The engine simulation test device capable of realizing ultrahigh compression temperature and pressure according to claim 1, wherein the cyclic heating mechanism (4) is an ethylene glycol cyclic heating mechanism.

9. The engine simulation test device capable of realizing ultrahigh compression temperature and pressure according to claim 8, wherein the ethylene glycol cyclic heating mechanism comprises a temperature control circulation pump (41), a water filter (42), an ethylene glycol box (43), an electric heater (44), a second temperature sensor (45), a fifth pressure sensor (46) and a tubular heat exchanger (47), the tubular heat exchanger (47) is disposed inside the pressure stabilizing tank (31), two ends of the tubular heat exchanger (47) are respectively connected with a water outlet end and a water return end of the ethylene glycol box (43), the electric heater (44) is disposed inside the ethylene glycol box (43), the second temperature sensor (45) and the fifth pressure sensor (46) are disposed between the water outlet end of the ethylene glycol box (43) and the tubular heat exchanger (47), and the temperature control circulation pump (41) and the water filter (42) are disposed on the water return end of the ethylene glycol box (43).

10. The engine simulation test device capable of realizing ultrahigh compression temperature and pressure according to claim 9, wherein the second temperature sensor (45) and the fifth pressure sensor (46) are in communication connection with the electric heater (44).

\* \* \* \* \*